United States Patent [19]

Marcus

[11] 4,275,917
[45] Jun. 30, 1981

[54] AUXILIARY VISOR

[75] Inventor: Konrad H. Marcus, Holland, Mich.

[73] Assignee: Prince Corporation, Holland, Mich.

[21] Appl. No.: 31,549

[22] Filed: Apr. 19, 1979

[51] Int. Cl.$^3$ .............................................. E60B 9/24
[52] U.S. Cl. ................................................ 296/97 R
[58] Field of Search ................... 296/96, 97 C, 97 G, 296/97 R, 97 F, 97 J, 97 K

[56] References Cited

U.S. PATENT DOCUMENTS

| 2,210,762 | 8/1940 | Itzigson | 296/97 K |
|---|---|---|---|
| 2,252,715 | 8/1941 | Levy | 296/97 C |
| 2,456,484 | 12/1948 | Bell | 296/97 K |
| 2,458,677 | 1/1949 | Brundage | 296/97 K |
| 2,549,395 | 4/1951 | Short, Sr. | 296/97 C |
| 3,159,421 | 12/1964 | Samuelson | 296/97 K |

FOREIGN PATENT DOCUMENTS

| 1917618 | 7/1970 | Fed. Rep. of Germany | 296/97 C |
|---|---|---|---|
| 1545330 | 9/1968 | France | 296/97 C |
| 600616 | 12/1959 | Italy | 296/97 K |

Primary Examiner—Robert R. Song
Assistant Examiner—Norman L. Stack, Jr.
Attorney, Agent, or Firm—Price, Heneveld, Huizenga & Cooper

[57] ABSTRACT

A visor is mounted to a vehicle to selectively fill in the gap above and behind the rearview mirror which is not covered by the usual vehicle sun visors and includes a glare shield movably mounted between stored and in use positions. The visor includes a compartment for the storage of small objects such as sunglasses and has sockets for releasably holding the end posts of the conventional sun visors.

6 Claims, 7 Drawing Figures

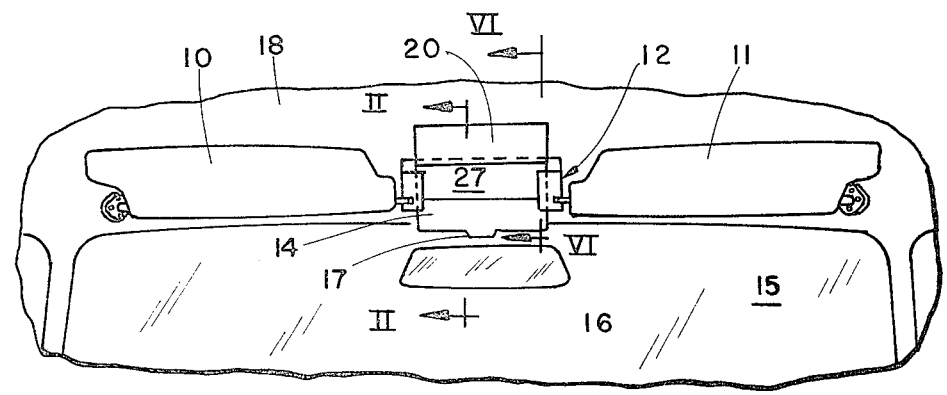
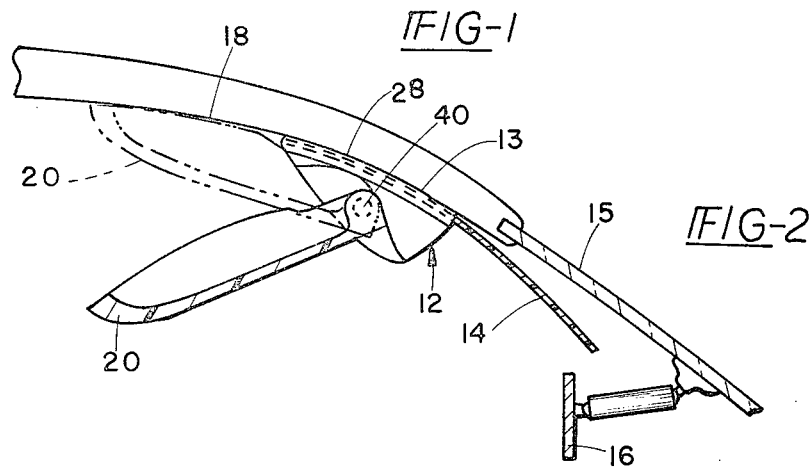

AUXILIARY VISOR

BACKGROUND OF THE INVENTION

This invention relates to an auxiliary sun shield for a vehicle or the like.

Standard sun visors for a vehicle leave a gap in the area of the rearview mirror because they cannot be esthetically designed to swing down and shield the area above and behind the rearview mirror without interfering with the mirror. Consequently, it has been found necessary to provide some means of shielding this unprotected area. Past solutions to this need have involved various add on devices which typically clip on to the rearview mirror post and are not easy to use and which do not integrate well with the structure of the car.

SUMMARY OF THE INVENTION

It is an object of this invention to provide an auxiliary visor for a vehicle to compensate for the center area obstructed by the rearview mirror and left unprotected by standard vehicle sun visors.

Another object of this invention is to provide an auxiliary visor for a car which combines with the existing structure of a vehicle by providing a means for releasably clamping the end posts of the usual vehicle sun visors.

A further object of this invention is to provide a combined visor and container for the storage of small objects against the headliner between the two standard sun visors and which contains means for holding a shield member for movement between a raised and lowered position. The shield member is of a shape and size sufficient to fill the gap left by the vehicle sun visors and substantially fill the area behind a rearview mirror when in a lowered position.

These and other objects will become apparent from reading the following description thereof together with reference to the following drawings in which:

BRIEF DESCRIPTION OF THE DRAWINGS

FIG. 1 is a perspective view showing the auxiliary visor of the invention surrounded by the vehicle sun visors, mirror, and part of the vehicle headliner and windshield;

FIG. 2 is an enlarged cross-sectional view taken along section line II—II of FIG. 1;

FIG. 3 is an exploded fragmentary perspective view of an end of a portion of the auxiliary visor as viewed from the center;

FIG. 4 is a fragmentary perspective view of the outer end of the other side of the structure seen in FIG. 3;

FIG. 5 is a perspective view on a reduced scale showing the mounting member of the auxiliary visor;

DETAILED DESCRIPTION OF THE PREFERRED EMBODIMENT

Figure 6:
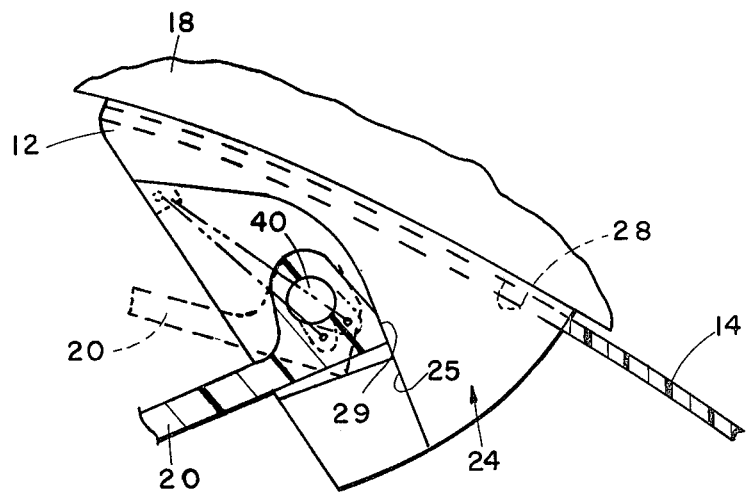
FIG. 6 is an enlarged fragmentary cross-sectional view of the auxiliary visor taken along section line VI—VI of FIG. 1 but with the container in an open position.

Referring to FIGS. 1 and 2, an auxiliary visor 20 embodying the invention is shown mounted between two standard sun visors 10 and 11. A mounting member 12 is mounted between the sun visors to the vehicle headliner 18 by screws 22 extending through apertures 21 in member 12 (FIG. 3). Member 12 slidably holds a shield element 14 which adjustably slides up and down in member 12 between stored and in use positions to selectively fill the gap between the sun visors and above the rearview mirror 16 mounted to windshield 15. Shield 14 includes a tab 17 (FIG. 1) serving as a handle for drawing the shield downwardly from member 12. Shield 14 is preferably formed of a resilient, opaque material, such as polycarbonate or ABS, and is of a width and height sufficient to fill the gap left by the visors. The resiliency of shield 14 allows it to curve to conform to the vehicle headliner 18 when stored in the up position within the mounting member 12.

A container comprising a concave tray 20 pivotally mounted to member 12 provides for the storage of small objects such as sunglasses against the vehicle headliner 18. Member 12 also releasably receives the end posts of the conventional visors 10 and 11. Having briefly described the overall system, a detailed description follows.

Referring to FIGS. 3-5, the mounting member 12 is molded of polycarbonate, ABS, or similar suitable lubricious polymeric material and is mounted between the vehicle sun visors to the vehicle headliner by screws 22 or any other suitable mounting means. The mounting member has a pair of spaced end walls 24 joined by wall 13 curved to conform to the vehicle's headliner as best seen in FIG. 2. Formed in each of the inside facing surfaces 26 of end walls 24 at the junction with wall 13 are opposed curved, rectangular grooves 28. Grooves 28 are of a thickness slightly greater than the thickness of the shield 14 to provide a slidable mount for the shield. Each end wall 24 of mounting member 12 further has a downwardly extending projection 30 in which is formed a slotted journal 32. Walls 24 also include an inwardly formed recess 34 spaced outwardly from projections 30. An eyelet 36 (FIG. 3) is formed in walls 24 near the top of each recess 34 and serves as means to hook the upper end of a spring 38 for the purpose described below.

Tray 20, which is best seen in FIGS. 1 and 2, includes at the corner of opposite ends an outwardly extending shaft 40 with an offset arm 42 (FIGS. 3, 6, 7) formed on its outer end. Arm 42 may be an integral part of the shaft or rigidly attached thereto. The end of the arm 42 has a small aperture 44 which serves to hook the lower end of spring 38. Shaft 40 is rigidly and nonrotatably attached to the tray 20 and is preferably integrally molded therewith. The ends of the shafts 40 are snap fitted within and rotatably supported by journals 32. For this purpose, the journals 32 include a tapered camming surface 33 (FIG. 4) to facilitate installation of tray 20 to member 12.

Tray 20 is dish-shaped (i.e., concave) and is formed along its edges so that it conforms to the vehicle headliner 18 when in its closed or up position as seen in FIG. 1 and in phantom form in FIG. 2. The width of tray member 20 is approximately equal to the distance between two projections 30 of the member 12. The tray member can be formed of polycarbonate, ABS, or other suitable material for the automotive environment. The tray can be padded or upholstered on the outside and inside if desired.

Figure 7:
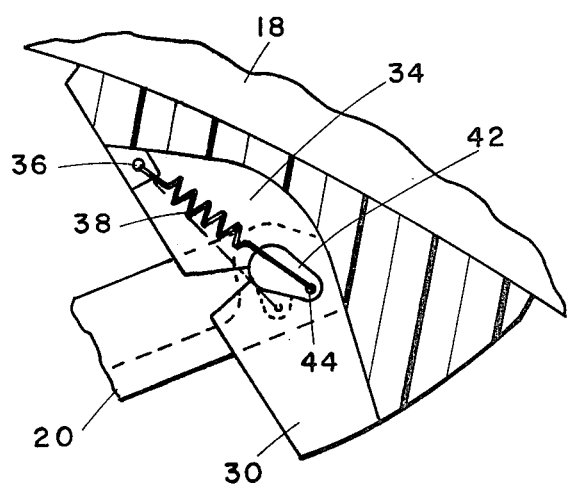
FIG. 7 is an enlarged fragmentary cross-sectional view taken along section line VII—VII in FIG. 3 shown with the container installed.

Arm 42 and spring 38 are disposed in the recess 34 in both the opened and closed positions of the tray 20. Spring 38 has its upper end hooked into the aperture 44 of arm 42. As seen in FIGS. 6 and 7, spring 38 pulls the member 42 over center, that is, to one side or the other of the axis of shafts 40 when the tray member is moved into either the up or down position and holds it in that position. The strength of tension spring 38 is selected to accomplish this and is determined by the weight of the tray member 20 and its contents. The rear edge 29 of tray 20 engages the front surface 25 of walls 24 (FIGS. 4 and 6) to serve as a stop for the tray holding in an open position slightly downwardly inclined as seen in FIGS. 2 and 6. A thin, rectangular decorative panel 27 (FIG. 1 only) is employed to cover recesses 34 and the tray operating mechanism. Panel 27 is mounted to member 12 under screws 22 and does not interfere with the operation of either the tray 20 or the shield 14.

A recess 46 is formed in the outside of end walls 24 as seen in FIG. 4 to provide support for the end posts (not shown) of sun visors 10 and 11. The recesses 46 have a constricted throat portion and the resiliency of the materials forming member 12 acts to releasably receive and clamp the visor end posts.

The glare shield 14 slides in the facing grooves 28 and can be moved from the stored position within the grooves or can be moved to any desired extended, operative position filling the gap between the existing sun visors or to any intermediate position. In any of the selected positions of the glare shield 14, tray 20 can be moved between its open and closed position. Similarly, the sun visors 10 can have their inboard ends detached from the recesses 46 in any of the positions of either the glare shield 14 or the tray 20 without interference.

Shield 14, instead of being opaque, can be made of a transparent material which is tinted to screen out undesired sunlight or glare. Thus, the present invention provides an auxiliary visor with storage means for small objects as well as a continuously adjustable shield and means for releasably holding the ends of conventional visors.

It will become apparent to those skilled in the art that these and various other modifications to the preferred embodiment of the invention described and disclosed herein can be made without departing from the spirit or scope thereof as defined by the appended claims.

The embodiments of the invention in which an exclusive property or privilege is claimed are defined as follows:

1. An auxiliary visor for a vehicle having a pair of sun visors supported at opposite sides and above the vehicle windshield and a rearview mirror mounted between the sun visors, said visor comprising:
  a mounting member adapted to be mounted to said vehicle above the windshield and centrally between the vehicle's visors wherein said mounting member includes a pair of opposed support means for releasably receiving and supporting the end posts of the pair of vehicle sun visors; and
  a unitary shield supported by said member for movement with respect to said mounting member from a stored position above the windshield to an operating position extended from said mounting member in which said unitary shield covers the area of the windshield near the top thereof and between the visors, said shield being shaped to extend substantially to the edge of the existing visors to substantially fill in the gap between the visors.

2. The apparatus as defined in claim 1 and further comprising a tray for storing articles, said tray pivotally mounted to said mounting member for movement between an open position providing access to said tray and a closed position.

3. The apparatus as defined in claims 1, or 2 wherein said shield comprises a resilient, semirigid sheet of material of a width substantially equal to the space between the vehicle visors and a length substantially equal to the distance between the vehicle's rearview mirror and the top of the vehicle windshield, and wherein said shield is slidably mounted to said mounting member.

4. The apparatus as defined in claim 3 wherein said mounting member includes a pair of spaced grooves which are curved to be disposed in generally uniformly spaced relationship to a curved headliner of the vehicle.

5. The apparatus as defined in claim 4 and further comprising means for biasing said tray to maintain it in a selected one of its said open or said closed positions.

6. The apparatus as defined in claim 5 wherein said tray includes a pair of shafts extending outwardly from opposite edges of said tray and wherein said mounting member includes journal means for receiving said shafts and wherein said biasing means includes a spring connected to an offset arm extending radially from one end of at least one of said shafts to said mounting member for maintaining said tray member in a selected one of its said open or said closed positions.

* * * * *